May 28, 1935.  F. BARTLING ET AL  2,002,684
METHOD OF PREPARING POTASSIUM CARBONATE OR POTASSIUM HYDROXIDE
Filed Oct. 12, 1931
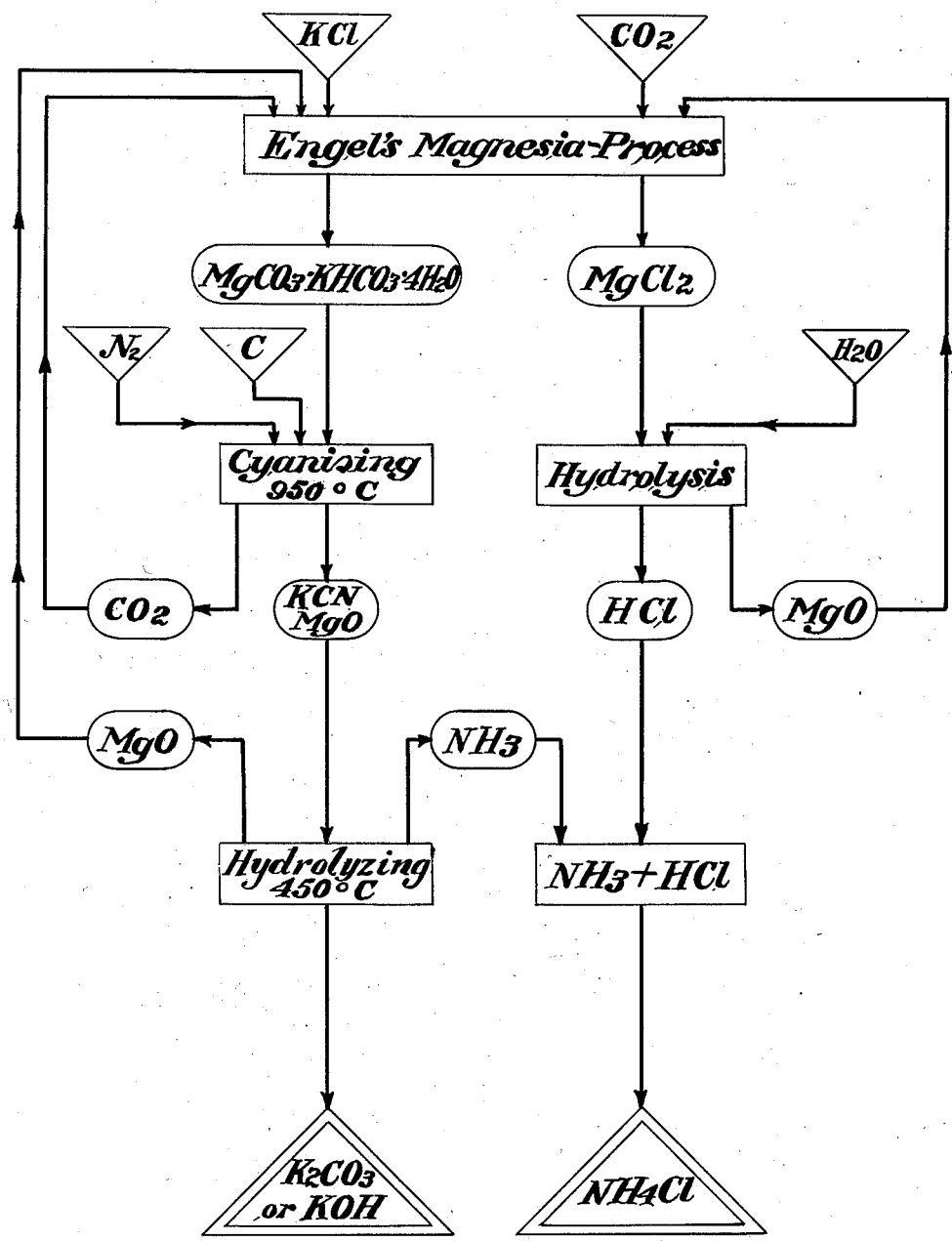
Inventors:
Friedrich Bartling,
Hermann Fricke,
By
Attorneys.

Patented May 28, 1935

2,002,684

UNITED STATES PATENT OFFICE 2,002,684

METHOD OF PREPARING POTASSIUM CARBONATE OR POTASSIUM HYDROXIDE

Friedrich Bartling, Huglfing, and Hermann Fricke, Munich, Germany; Jenny Bartling, Huglfing, Germany, executrix of said Friedrich Bartling, deceased, assignors to Alterum Kredit-Aktien-Gesellschaft, Berlin, Germany, a company of Germany Application October 12, 1931, Serial No. 568,520
In Germany October 24, 1930

2 Claims. (Cl. 23—63)

In Engel's magnesia process for the manufacture of potash, the double salt $MgCO_3.KHCO_3.4H_2O$ is formed from potassium chloride, magnesium carbonate, water and carbon dioxide. By decomposition with water under heat and pressure, this double salt is then decomposed into potash, magnesium carbonate and carbon dioxide (in addition to water). The magnesium carbonate must then be burnt for the purpose of obtaining the crystalline tri-hydrate required for forming again the double salt.

This Engel process (see German Patents 15,280; 50,786; 55,182; 57,721; 125,987; 141,808; 144,742; 155,007; and 172,313) is described as to its technical operation in Ullmann's "Enzyklopaedie der Technischen Chemie" (Berlin-Vienna, 1915, 1919), vol. VI, pages 614 and 615.

The drawing comprises a flow sheet showing the progress of the reactions, and the manner of bringing the various constituents together.

The modification according to this invention of this well known process consists in cyanizing in a manner known in itself the double salt $MgCO_3.KHCO_3.4H_2O$ obtained when carrying out Engel's magnesia process, and in treating with steam to produce a hydrolyzing (sometimes called "saponifying") effect upon the product obtained in a manner known in itself, with the result that ammonia is obtained.

The drawing presents a flow sheet indicating the course of the reactions involved. The double salt is mixed with coal and exposed to the action of nitrogen at a high temperature (for example 950° C.), resulting in the formation of magnesium oxide (MgO) and potassium cyanide (KCN). The reaction mass obtained is thereupon exposed to the action of steam at a lower temperature, between 350 and 500° C., for the purpose of converting the potassium cyanide into potash, with the simultaneous production of ammonia. The residual products comprise the ammonia which can be obtained as a gas, the potash which is obtained in solution, and a mixture of magnesium oxide with the residue of the coal used. The mixture of magnesium oxide and coal residue may be separated by well known processes for obtaining magnesium oxide which may be used again in the manufacture of the double salt after suitable conversion into the crystalline $MgCO_3.3H_2O$, during the course of recycling.

The treatment of the double salt with water under heat and pressure, with the subsequent conversion of the magnesium carbonate into magnesium oxide by burning, hitherto required in Engel's process is therefore replaced in the process according to the invention by a cyanization and by a subsequent hydrolysis of the reaction products.

The special advantage of the process according to the invention lies in the fact that not only does it produce a larger yield of potash than the well known magnesia process but also the highly valuable ammonia is obtained as a by-product.

In addition to this important advantage, a further development of the process consists in producing the more valuable potassium hydroxide as the end product of the hydrolysis instead of potash. Whilst the formation of potash from potassium cyanide by hydrolysis takes place in accordance with the equation

$$2KCN + 4H_2O = K_2CO_3 + CO + H_2 + 2NH_3$$

the reaction for the manufacture of caustic potash takes place according to the equation

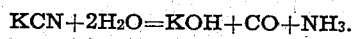
$$KCN + 2H_2O = KOH + CO + NH_3.$$

If it is intended to manufacture potash (potassium carbonate) this can be done for instance by treating with steam the reaction mass containing the potassium cyanide, heaped-up in a thick layer. The steam is preferably passed through the thickly stratified mass. On the other hand for the manufacture of potassium hydroxide, the mass containing potassium cyanide is spread out in thin layers for the treatment with steam. It is sufficient then to pass the steam over the spread-out thin layers in order to effect the desired conversion of potassium cyanide into potassium hydroxide. It is also quite easy in practice to carry out the partial process of hydrolysis in a different way, for the formation of either $K_2CO_3$ or $KOH$, that is to say, the features relating chiefly to the thickness of layer of the cyanide-containing material are meant merely as an example for carrying out the process for producing either potash or the more valuable potassium hydroxide.

In another advantageous modification of the process according to the invention, the ammonia formed during the hydrolysis is allowed to combine with the chlorine or hydrochloric acid obtained in the process, to form ammonium chloride ($NH_4Cl$). An exceedingly valuable manure is thus obtained in addition to the potash or potassium hydroxide.

The production of chlorine or of hydrochloric acid for the manufacture of ammonium chloride follows from the decomposition of the magnesium chloride left after the precipitation of the double salt. The magnesium chloride ($MgCl_2$) can be decomposed, for example by heating in the presence of water, into magnesium oxide and hydrochloric acid, the latter being driven off by the heat. The reaction between hydrochloric acid and ammonia to form ammonium chloride can be carried out very easily, as is well known. This magnesium oxide may be reintroduced for forming a further quantity of the double salt, in a cyclic manner.

The reactions may be regarded as occurring, as brought out on the flow sheet, in accordance with the following equations, in which the letters in parenthesis indicate a transfer of material from one equation to another:

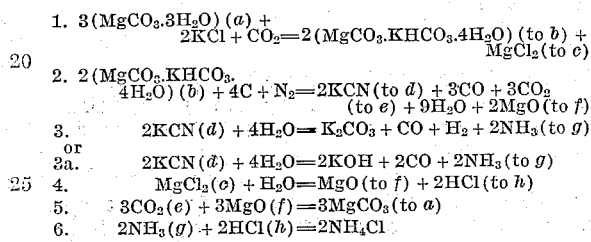

The advantageous developments of the process according to the invention, above referred to, and more particularly the production of ammonia as a by-product in the manufacture of potash, which as already shown can be obtained without any extra expenditure, show the very important technical value of the invention, obtained by surprisingly simple steps.

The raw material hitherto used for the manufacture of potash, the double salt $$MgCO_3KHCO_3.4H_2O,$$

as has been proved by experiments, is moreover eminently suitable for carrying out the cyanization. This is probably due to the fact that the mixtures of coal and the double salt, when briquetted or agglomerated for the purpose of cyanidizing, have a very porous structure in the highly heated state. This structure is evidently caused by the fact that during heating, the potassium bicarbonate and the magnesium carbonate are decomposed with liberation of carbon dioxide and water. The released gases form small hollow spaces or ducts in the interior of the briquette. It is obvious that the highly porous structure thus formed is much more easily accessible to the action of nitrogen than a compact mass. A very important point is the fact that the briquette made from coal and the double salt has a very good strength which makes it possible to use it in industrial furnaces. For obtaining the potash or potassium hydrate from the briquettes, the latter must generally be lixiviated in accordance with the well known methods. After separation of solid substances from the solution by filtering or the like, the potash or potassium hydroxide can be obtained in the usual manner.

A cyclic process is thus presented in which magnesium oxide from the hydrolysis of the cyanide, and also magesium oxide from the hydrolysis of the magnesium chloride, may both be reintroduced for the formation of the double salt, as above indicated.

I claim:

1. The process of preparing potassium hydroxide or carbonate which comprises treating potassium chloride and magnesium carbonate in aqueous solution with carbon dioxide, removing the precipitated doube salt $MgCO_3KHCO_3.4H_2O$ from the magnesium chloride liquor, mixing said double salt with carbon and heating it to a temperature of substantially 950 degrees C. in an atmosphere of nitrogen whereby to produce potassium cyanide mixed with magnesium oxide, treating the mixture with steam at a temperature of from 350 to 500 degrees C., lixiviating the soluble potassium compounds to produce a magnesium chloride liquor, heating the magnesium chloride liquor to produce hydrochloric acid and magnesium oxide, passing the ammonia produced during the steam treatment of the cyanide into contact with the hydrochloric acid and whereby to produce ammonium chloride, withdrawing the magnesium oxide from both operations and returning it in cycle for the production of a further quantity of the double salt.

2. A process for the manufacture of potassium hydroxide or carbonate which comprises mixing the double salt $MgCO_3KHCO_3.4H_2O$ with carbon and heating the mixture to a temperature of substantially 950 degrees C. in the presence of nitrogen whereby to produce a mixture containing potassium cyanide and magnesium oxide, treating the mixture with steam at a temperature between 350 and 500 degrees C. to produce the potassium hydroxide and carbonate from the cyanide, separating the magnesium oxide from the mixture and reacting it with potassium chloride in the presence of carbon dioxide for producing a further quantity of double salt.

FRIEDRICH BARTLING.
HERMANN FRICKE.